Sept. 25, 1956
E. C. MILLER
2,764,692
ANALYZER
Filed Aug. 11, 1952
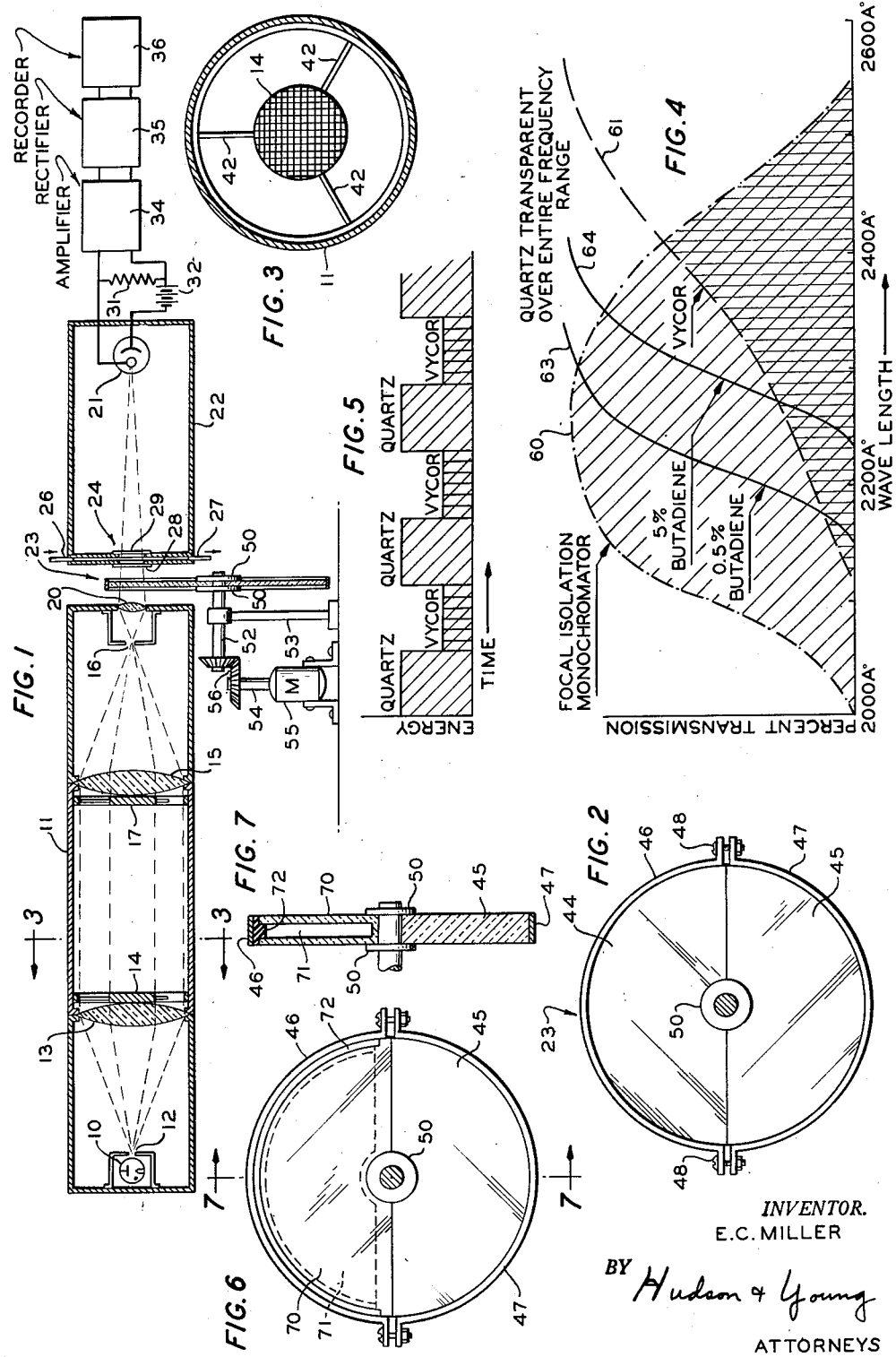
INVENTOR.
E.C. MILLER
BY Hudson & Young
ATTORNEYS

United States Patent Office 2,764,692
Patented Sept. 25, 1956

2,764,692

ANALYZER

Elmer C. Miller, Bartlesville, Okla., assignor to Phillips Petroleum Company, a corporation of Delaware Application August 11, 1952, Serial No. 303,765

15 Claims. (Cl. 250—43.5)

This invention relates to a method of and apparatus for detecting the presence and concentration of materials capable of absorbing electromagnetic radiation of selective wave lengths. In another aspect it relates to apparatus for analyzing a gaseous hydrocarbon stream to detect the concentration of a particular component thereof.

It is known that various materials are capable of absorbing electromagnetic radiation of selective wave lengths and this property has been utilized to detect the presence and concentration of such materials in sample fluid streams or in selected solids. Analysis systems of this sort have, for the most part, consisted of means for passing a first beam of radiation through a sample of the material under test and for passing a second beam of radiation through a standard or reference material. The intensities of the two resulting beams are compared, any difference in such intensities being an indication of the concentration of the particular material under analysis. This comparison normally is made by an electrical circuit associated with suitable radiation detectors.

In accordance with the present invention a method and apparatus are provided whereby suitable electromagnetic radiation is passed first through a focal isolation monochromator to limit the radiation beam to wave lengths within a selected band. The filtered radiation beam is directed through a sample of the material under analysis and thence to a detector unit capable of responding rapidly to changes in intensity of the radiation beam impinging thereon. A material having radiation absorption characteristics approximating those of the material under analysis is alternately placed in and removed from the optical path of the radiation beam at a selected frequency. The resulting energy of the radiation beam impinging upon the detector unit is converted to electrical energy representative of differences in intensity of the beam impinging upon the detector unit. This alternating electrical signal subsequently is amplified and filtered to provide a direct current, the magnitude of which is inversely proportioned to the concentration of the material under analysis.

If the sample under analysis does not contain material capable of absorbing wave lengths of the radiation transmitted through the monochromator the resulting beam impinging upon the detector after passing through only the sample will be at a maximum. During those time intervals when the material having absorption characteristics approximating the absorption characteristics of the material under analysis is positioned in the radiation beam some of the wave lengths of the beam will be absorbed such that the energy impinging upon the detector will be a minimum. Thus the radiant energy striking the detector will alternately be at a maximum and a minimum as the material having radiation absorption characteristics approximating the absorption characteristics of the material under analysis is placed in and removed from the radiation beam. When the sample under analysis contains a material capable of absorbing radiation within the wave length band passed by the monochromator the energy of the beam passing through only the sample will be decreased from its previous maximum. However, the energy passing through both the sample and the material periodically positioned in the radiation beam will remain at its previous minimum because any energy absorbed by the sample material is also absorbed by the material alternately positioned in the radiation beam. Thus, by suitable calibration the percentage of the material under analysis can readily be determined through a measurement of the differences in intensity of the beam striking the detector unit.

Accordingly, it is an object of this invention to provide an improved method of analyzing for the presence of materials capable of absorbing electromagnetic radiation of selected wave lengths.

A further object is to provide apparatus for detecting the presence of a selected component in a sample stream continuously circulated through the analyzer.

A further object is to provide an improved optical analyzer employing a focal isolation monochromator to limit the transmitted radiation to selected wave lengths.

A still further object is to provide apparatus which is of durable constitution, simple in operation and reliable in performance.

Various other objects, advantages and features of this invention should become apparent from the following detailed description taken in conjunction with accompanying drawings in which:

Figure 1 is a schematic representation of one embodiment of the analyzer of this invention;

Figure 2 is a front elevation view of a rotatable disk for positioning into and removing from the radiation beam a material having radiation absorption characteristics approximating those of the material under analysis;

Figure 3 is a sectional view illustrating a feature of the focal isolation monochromator;

Figure 4 is a graph illustrating absorption characteristics of selected materials;

Figure 5 is a graph illustrating a feature of this invention;

Figure 6 is a front elevation view of a second revolving disk which can be employed with the invention; and Figure 7 is a sectional view of the disk of Figure 6.

For purposes of explaining the present invention the following description will be given in conjunction with an embodiment of the analyzer which is particularly adapted to detect the presence of butadiene in a sample stream containing butenes and butadiene. As is more fully discussed hereinafter the invention is by no means limited to this particular application which is given merely by way of illustration.

Referring now to the drawing in detail and to Figure 1 in particular, ultraviolet radiation is provided by a suitable source which can be a hydrogen discharge lamp 10 mounted in one end of a tubular housing 11. Radiation emitted from source 10 is directed through an aperture 12 and thence through the focal isolation monochromator which comprises a first converging lens 13 positioned such that aperture 12 is at the principal focus of lens 13. An opaque circular disk 14 is mounted in housing 11 adjacent lens 13. A second converging lens 15 is positioned in the path of radiation transmitted through lens 13 and serves to concentrate such radiation in the region of a second aperture 16 which is positioned at the principal focus of lens 15 (with respect to a selected wave length to be transmitted by the monochromator). A second opaque disk 17 is mounted in housing 11 adjacent lens 15. Disks 14 and 17 can be positioned on either side of respective lenses 13 and 15 preferably in closely spaced relationship therewith. A third lens 20 is positioned with respect to aperture 16 such that radiation transmitted through aperture 16 is concentrated at radiation detector 21, which can be a suitable photocell such as a photo multiplier tube. Detector 21 is mounted at the far end of a second tubular housing 22. A sample cell 24 forms one end of housing 22 in the path of radiation between lens 20 and detector 21. Cell 24 is provided with an inlet conduit 26 and an outlet conduit 27 through which the sample stream under analysis is circulated and with windows 28 and 29 which are transparent to the radiation directed therethrough. A rotatable disk 23 containing a sector of material having radiation absorption characteristics approximating the absorption characteristics of butadiene is positioned for rotation between lens 20 and detector 21. The anode of tube 21 is connected through a resistor 31 to the positive terminal of a voltage source 32, the negative terminal of which is connected to the cathode of said tube 21. The voltage drop across resistor 31, which is an indication of the radiant energy impinging upon tube 21, is applied to the input of an alternating current amplifier 34, the output of which is applied to a rectifier 35 and thence to a suitable direct current recorder 36.

The operation of the focal isolation monochromator to provide radiation within a selected frequency band can be explained in the following manner. Lenses 13 and 15 are positioned with respect to source 10 such that radiation emitted therefrom is focused in the region of aperture 16. Both lenses 13 and 15 preferably are constructed of fused quartz which is transparent to the ultraviolet radiation under consideration and which exhibits a rather rapid change in refractive index with change in wavelength in the general region of approximately 1800 to 3000 Angstrom (A.) units. Representative values are as follows:

| Wave Length (A.) | Index of Refraction (18° C.) |
|---|---|
| 1854.67 | 1.57436 |
| 3034.12 | 1.48594 |

This change in refractive index with changing wavelength results in chromatic aberration of the lens such that aperture 12 is not focused at an exact point along the common optical axis of lenses 13 and 15, but rather the different wavelengths emitted from source 10 are focused at different points along the optical axis. The longer wavelengths are focused at a point farther from lens 15 than are the shorter wavelengths. By positioning aperture 16 at a selected point the longer wavelengths, that is those wavelengths above approximately 2600 A., are partially transmitted through aperture 16. By positioning opaque disks 14 and 17 adjacent respective lenses 13 and 15 on the optical axis thereof, a large portion of these longer wavelengths is removed from the resulting radiation beam. The shorter wavelengths, that is those wavelengths below approximately 2000 A., normally are focused at a point in front of aperture 16 with the result that some of these wavelengths are transmitted through aperture 16. Opaque disks 14 and 17 also remove a large portion of these shorter wavelengths from the resulting radiation beam. As shown in Figure 3, disk 14 preferably is painted black to avoid light reflection in the system and is supported within housing 40 by a plurality of legs 42. Disk 17 is constructed and mounted in like manner.

Rotatable disk 23, Figure 2, is generally circular in shape and is constructed of two sectors 44 and 45 of materials which are respectively transparent to the radiation passed by the monochromator and have radiation absorption characteristics approximating those of the material under analysis. Sector 44 can be formed of used quartz and sector 45 from "Vycor" when butadiene is being detected in sample cell 24. Vycor is heat resistant glass manufactured by Corning Glass Works, Corning, New York, containing approximately 96% silicon dioxide. As such, Vycor has ultraviolet transmission characteristics approximating those of butadiene, as is more fully described hereinafter in conjunction with Figure 4. Disk 23 is provided at its periphery with metal bands 46 and 47 joined together by bolts 48 to provide a rigid construction for high speed operation. Mounting disks 50 are positioned on each side of sectors 44 and 45 and serve to attach these sectors to a shaft 52 which is supported by a bracket 53. Shaft 52 is coupled to the drive shaft 54 of a synchronous motor 55 by means of bevel gears 56 or by any other convenient arrangement. Motor 55 thus rotates disk 23 at a preselected speed to position Vycor sector 45 alternately into and out of the radiation beam. Quartz sector 44 is transparent to the radiation under consideration but is added to disk 23 to provide a mechanically and dynamically balanced disk structure.

The operation of the analyzer of this invention can be understood from the transmission curves illustrated in Figures 4 and 5 wherein the energy transmitted through various elements is plotted against the wavelength of the radiation transmitted. Curve 60 represents the total energy transmitted through the focal isolation monochromator as the area under said curve 60. In the described embodiment of this invention aperture 16, lenses 13 and 15, and disks 14 and 17 are constructed and positioned such that the radiation transmitted through aperture 16 lies in a region generally between 2000 and 2600 A. Curve 61 represents the general transmission properties of Vycor which transmits ultraviolet radiation in a region having wavelengths longer than approximately 2100 A. The slope of curve 61 is of course dependent upon the thickness of sector 45 in disk 23. Figure 5 represents the energy of the radiation beam impinging upon detector 21 for the time intervals when the respective quartz and Vycor sectors 44 and 45 are disposed in the radiation beam. During the time that the quartz sector is positioned in the radiation beam the energy transmitted is the area beneath curve 60 in Figure 4 (oblique lines) because quartz is transparent over the entire frequency range represented in Figure 4. This total energy is represented by the upper level in Figure 5. During the time interval that the Vycor section is in the radiation beam the energy transmitted is the area beneath both curve 60 and also curve 61 (vertical lines). This total energy is represented as the lower level in Figure 5. The output signal measured by recorder 36 is representative of the difference in the energy levels of the quartz and Vycor curves of Figure 5.

Curves 63 and 64 in Figure 4 represent the energy transmitted when sample streams containing respectively 0.5% butadiene and 5% butadiene are passed through cell 23. It should readily be apparent that the effect of butadiene in the sample stream is such as to materially lessen the energy transmitted through the quartz sector 44 of disk 23, but has little effect upon the energy transmitted through the Vycor sector of disk 23. Thus the higher the percentage of butadiene present in the sample stream the less the differential between the energy transmitted during the times the respective quartz and Vycor sections are in the radiation beam. This in effect reduces the net signal applied to recorder 36 with the result that the magnitude of this reduction in signal is a direct indication of the percentage of butadiene present in the sample stream.

While for purposes of illustration the foregoing description has been with respect to an analyzer adapted to detect the presence of butadiene in a hydrocarbon stream, the present invention is by no means limited to such an analysis. The principles of this invention are applicable to the analysis of any type material capable of absorbing radiation which is characteristic of the material under consideration. In addition to ultraviolet radiation, infrared or visible light can be employed equally well for some types of analysis. If infrared radiation is to be employed the detector 21 preferably can be a bolometer or a thermistor which is capable of detecting temperature changes produced by differences in intensity of infrared radiation impinging thereon. While it is desired to employ a solid material for the filter sector in disk 23, for some applications this is not practical because suitable solid filters are not available. In such instances the disk illustrated in Figures 6 and 7 can be employed to advantage. As therein illustrated sector 45 is replaced by a sector 70 having a hollow chamber 71 therein. Chamber 71 is adapted to contain either a gas or liquid having absorption characteristics approximating those of the material under analysis, and is provided with a sealing gasket 72 which is secured in position by a clamp 46. For many applications it is convenient to fill chamber 71 with a pure sample of the material under analysis. In the butadiene analysis hereinbefore described the disk arrangement of Figures 6 and 7 can be employed with butadiene filling chamber 71. The thickness of sample cell 24 is of course dependent upon the concentration of the material under analysis in the sample stream and upon the intensity of radiation absorbed by this material. If necessary a multiple reflection path can be provided to transmit the sample through cell 24 a plurality of times to increase the radiation absorbed thereby.

It further should be apparent to those skilled in the art that various other forms of apparatus can be devised for alternately placing into and withdrawing from the beam of radiation a filter material having absorption characteristics approximating those of the material under analysis. One such scheme that can be employed in this manner comprises an oscillating plate adapted to be moved into and withdrawn from the radiation beam at a preselected frequency through the use of suitable mechanical reciprocating motive power. Thus, from the foregoing description it should be apparent that this invention is not limited to the particular embodiments herein described and it is not intended that the invention be limited thereto.

What is claimed is:

1. The process of analyzing a sample stream for the presence of a component therein capable of absorbing electromagnetic radiation of selected wave lengths comprising directing a beam of ultraviolet radiation through said sample stream, said beam of ultraviolet radiation containing wave lengths within a preselected band which are absorbed by the component under analysis, filtering said beam to exclude wave lengths longer and shorter than those within said preselected band, the selected radiation absorbed by the component under analysis being within the band of wave lengths not excluded, alternately positioning into and removing from said beam at a preselected frequency a substance having radiation absorption characteristics approximating the radiation absorption characteristics of the component being analyzed, and measuring the intensity variation of the resulting radiation beam.

2. The process of analyzing a sample stream for the presence of butadiene comprising directing a beam of ultraviolet radiation through said sample stream, said beam of ultraviolet radiation including wave lengths between 2000 Angstrom units and 2600 Angstrom units, filtering said beam to exclude wave lengths shorter than approximately 2000 Angstrom units and longer than approximately 2600 Angstrom units, alternately positioning into and removing from said beam at a preselected frequency a material having radiation absorption characteristics approximating the radiation absorption characteristics of butadiene, and measuring the intensity variation of the resulting radiation beam.

3. The method in accordance with claim 2 wherein said material alternately positioned into and removed from said beam is glass comprising approximately 96% silicon dioxide.

4. The method in accordance with claim 2 wherein said material alternately positioned into and removed from said beam is butadiene.

5. Apparatus for analyzing a sample stream for the presence of a material capable of absorbing electromagnetic radiation of selected wave lengths comprising, in combination, a source of ultraviolet radiation, a sample cell disposed in the path of radiation emitted from said source, a focal isolation monochromator disposed in said radiation path, said monochromator being adapted to pass wave lengths within a preselected band and to block wave lengths longer and shorter than those within said band, the radiation absorbed by the material being tested being in the region of the band of wave lengths passed by said monochromator, a filter having radiation absorption characteristics approximating the radiation absorption characteristics of the material being analyzed, means alternately positioning said filter into and removing said filter from said radiation path, a photocell positioned in the path of the resulting radiation beam, and circuit means connected to said photocell to establish an alternating current, the amplitude variation of which is an inverse function of the radiation absorbed by the material being tested which in turn is indicative of the concentration of said material.

6. Apparatus for analyzing a sample stream for the presence of a material capable of absorbing electromagnetic radiation of selected wave lengths comprising, in combination, a source of radiation, a sample cell disposed in the path of radiation emitted from said source, a focal isolation monochromator disposed in said radiation path, said monochromator being adapted to pass only wave lengths within a preselected band, the radiation absorbed by the material being tested in the region of the band of wave lengths passed by said monochromator, a rotatable disk including a first sector transparent to the radiation passed by said monochromator and a second sector having radiation absorption characteristics approximating the radiation absorption characteristics of the material being analyzed, means for rotating said disk so that said first and second sectors are alternately positioned in the radiation path, and a radiation detector to measure the intensity variation of the resulting radiation beam.

7. The combination in accordance with claim 6 wherein said sectors are constructed of solid materials mechanically and dynamically balanced for high speed rotation.

8. The combination in accordance with claim 6 wherein said second sector comprises a chamber adapted to be filled with a fluid having radiation absorption characteristics approximating the radiation absorption characteristics of the material being analyzed.

9. Apparatus for analyzing a sample stream for the presence of butadiene comprising, in combination, a source of ultraviolet radiation having wave lengths between 2000 Angstrom units and 2600 Angstrom units, a sample cell disposed in the path of radiation emitted from said source, a focal isolation monochromator disposed in said radiation path to pass radiation in the region from approximately 2000 Angstrom units to approximately 2600 Angstrom units, a rotatable disk including a first solid sector transparent to radiation in the 2000 to 2600 Angstrom unit region approximating those of butadiene, said sectors being mechanically and dynamically balanced for high speed rotation, means for rotating said disk so that said first and second sectors are alternately positioned in the radiation path, and a radiation detector to measure the intensity variation of the resulting radiation beam.

10. The combination in accordance with claim 9 wherein said second sector is glass containing approximately 96% silicon dioxide.

11. Apparatus for analyzing a sample stream for the presence of a material capable of absorbing electromagnetic radiation of selected wave lengths comprising, in combination and in optical alignment, a source of radiation, a first aperture adjacent said source of radiation to pass a narrow beam of radiation, a first converging lens positioned such that said first aperture is at the principal focus of said first lens, a first opaque disk positioned adjacent said first lens symmetrically about the optical axis of said first lens to limit the radiation passed through said first lens, a second converging lens, a second aperture positioned at the principal focus of said second lens for radiation of a selected wave length, a second opaque disk positioned adjacent said second lens symmetrically about the optical axis of said second lens, a third converging lens to focus radiation passing through said second aperture at a selected location, a rotatable disk including a first sector transparent to the radiation passed by said aperture-lens-disk arrangement and a second sector having radiation absorption characteristics approximating the radiation absorption characteristics of the material being analyzed, means for rotating said disk whereby said first and second sectors are alternately positioned in the radiation path, a sample cell, said disk and said sample all being positioned between said third lens and said selected location, and a radiation detector positioned at said selected location to measure the intensity variation of the resulting radiation beam.

12. The combination in accordance with claim 11 wherein said source emits radiation in the ultraviolet spectrum, said lenses are constructed of quartz, and said detector is a photocell.

13. Analysis apparatus comprising a source of radiation, a first aperture adjacent said source of radiation to pass a narrow beam of radiation, a first converging lens positioned such that said first aperture is at the principal focus of said first lens, a first opaque disk positioned adjacent said first lens symmetrically about the optical axis of said first lens to limit the radiation passed through said first lens, a second converging lens, a second aperture positioned at the principal focus of said second lens for radiation of a selected wave length, a second opaque disk positioned adjacent said second lens symmetrically about the optical axis of said second lens, means to divide the transmitted radiation from said second aperture into two portions, filter means, means to direct one portion of said transmitted radiation through said filter means, means to direct said transmitted radiation through the material to be analyzed, and means to compare said two portions of said transmitted radiation.

14. The combination in accordance with claim 13 wherein said filter means absorbs radiation corresponding to radiation absorbed by the material to be analyzed.

15. Analysis apparatus comprising a source of radiation, a first aperture adjacent said source of radiation to pass a narrow beam of radiation, a first converging lens positioned such that said first aperture is at the principal focus of said first lens, a first opaque disk positioned adjacent said first lens symmetrically about the optical axis of said first lens to limit the radiation passed through said first lens, a second converging lens, a second aperture positioned at the principal focus of said second lens for radiation of a selected wave length, a second opaque disk positioned adjacent said second lens symmetrically about the optical axis of said second lens, means to direct the radiation transmitted from said second aperture through the material to be analyzed, and means to measure the radiation transmitted through the material to be analyzed.

References Cited in the file of this patent

UNITED STATES PATENTS

| | | |
|---|---|---|
| 1,963,185 | Wilson | June 19, 1934 |
| 2,439,373 | Stearns, Jr. | Apr. 6, 1948 |
| 2,534,657 | Bray | Dec. 19, 1950 |
| 2,607,899 | Cary et al. | Aug. 19, 1952 |
| 2,613,572 | Mathieu | Oct. 14, 1952 |